United States Patent [19]

Watanabe et al.

[11] 4,140,195
[45] Feb. 20, 1979

[54] POWER PLANT FOR PRIME MOVER-EQUIPPED BICYCLES

[75] Inventors: Masaki Watanabe, Niiza; Seishi Miura, Asaka; Takehisa Hirano, Tokyo; Sadashi Yamamoto, Wako, all of Japan

[73] Assignee: Honda Giken Kogyo Kabushiki Kaisha, Tokyo, Japan

[21] Appl. No.: 829,628

[22] Filed: Sep. 1, 1977

[30] Foreign Application Priority Data

Sep. 8, 1976 [JP] Japan .......................... 51-120751[U]
Sep. 8, 1976 [JP] Japan .......................... 51-120752[U]
Sep. 9, 1976 [JP] Japan .......................... 51-121762[U]
Sep. 9, 1976 [JP] Japan .......................... 51-121763[U]

[51] Int. Cl.² ............................................ B62K 11/00
[52] U.S. Cl. ................................. 180/33 C; 74/325; 74/665 Q
[58] Field of Search ................. 180/33 C, 33 R, 33 B; 74/325, 363, 366, 373, 665 P, 665 Q

[56] References Cited

U.S. PATENT DOCUMENTS

| | | | |
|---|---|---|---|
| 2,212,279 | 8/1940 | Steinlein et al. | 180/33 C |
| 2,760,385 | 8/1956 | Fuchs | 74/665 Q X |
| 4,026,375 | 5/1977 | Miura | 180/33 C |

Primary Examiner—Joseph F. Peters, Jr.
Assistant Examiner—Michael Mar
Attorney, Agent, or Firm—Irving M. Weiner; Pamela S. Austin; Melvin Yedlin

[57] ABSTRACT

A power plant for prime mover-equipped bicycles wherein a bicycle running and engine running can be changed over to each other. The running speed can be changed over to a low speed and high speed. The power transmitting system, including the speed changing mechanism, can be made simple and compact in structure, and a jointless change having no neutral position in the speed changing operation is possible. It is further possible to feed and interrupt the fuel and to switch the current source on and off with the jointless change.

16 Claims, 13 Drawing Figures

POWER PLANT FOR PRIME MOVER-EQUIPPED BICYCLES

The invention relates to power plants for prime mover-equipped bicycles wherein a bicycle running and engine running can be selected, and an engine power and artificial driving force can both be used.

More particularly, the present invention relates to a power plant for prime mover-equipped bicycles, wherein a bicycle running and engine running can be changed over to each other. In addition, the running speed can be changed over to a low speed and high speed. The power transmitting system including the speed changing mechanism can be made simple and compact in structure. Also, a jointless change having no neutral position in the speed changing operation is possible. Further, it is possible to feed and interrupt the fuel and to switch the current source on and off with the jointless change.

BACKGROUND OF THE INVENTION

In a bicycle equipped with a prime mover, a bicycle running with a pedal drive, and an engine running with both the pedal drive and an engine power has been made. It is preferable to form the power system so that each running may be changed to be selected, and the running speed may be changed over to two steps of a low speed and high speed in the case of running with the engine power together. Therefore, if a generally adopted system with a sprocket and chain is to be applied entirely to such power system, the power transmitting system will become cumbersome and large. And, in case a mechanism for changing over the engine power is to be also provided in the power system, the structure will be complicated and the power transmitting system will necessarily become large.

Further, as a speed changing means and power change are required, with the above, the operating system will necessarily become two systems. The manual operating member will also become two systems and not only the structure will be complicated, but also the changing operation will be complicated and difficult. Particularly, when it is considered that prime mover-equipped bicycles are to be used also by females and children, and are therefore required to be able to be handled and operated as conveniently as bicycles, the above power system will not be desirable.

When making a speed change in the prime mover-equipped bicycle, i.e., from a low speed to a high speed or vice versa, even if a synchromesh gear type speed changing gear is adopted, instead of the sprocket-chain system in the power transmitting system, a neutral state will be generated in the power transmission at the time of the speed change, and a joint will be made in the speed changing operation.

Such generation of the neutral state by the speed changing means with gears is not desirable for the following reasons.

In a prime mover-equipped bicycle, when running with engine power is used simultaneously and the output of the engine is to be controlled by an artificial driving operation, if there is a neutral state in the change-over from a low speed drive running to a high speed drive running or vice versa, as the engine output is controlled by the artificial drive, the driving force will not be transmitted to the engine controlling means, the engine output will reduce at the time of the change-over, and the gear will be shifted in this state. Thus, the driving force will be transmitted to artificial driving means, such as pedals, and not only a smooth changing operation will not be achieved, but also the artificial operation will be dangerous.

In the prime mover-equipped bicycle, the engine is started by an artificial operation of driving the pedals. The changing means is operated with the bicycle running as it is, and the pedal driving system and engine starting system are connected with each other through clutch means to transmit the power of the pedals to the crankshaft of the engine to start it.

At the time of starting, as opposed to the bicycle running, besides this running drive, not only a large treading force to compress and move the piston through the crankshaft will be required, but also the clutch means connecting and disconnecting the pedal driving system and engine starting system with each other has not been considered. Problems such as the following will arise.

In the pedal starting device for the conventional prime mover-equipped bicycle, as the clutch means is connected independently of the position of the pedal, it may be connected with the engine starting system when the pedal is at or near the top dead point. Thus, even if a treading force is applied to the pedal, the pedal will be difficult to rotate.

At the time of starting the engine, all the load on the engine starting system will be applied to the pedal. Therefore, at or near the top dead point, the pedal will be difficult to rotate and the engine starting operation will be very difficult.

At the time of the bicycle running, it will be unnecessary to feed a fuel to the engine and to feed electricity to the ignition system or the like. Therefore, when the engine stops, it will be necessary to interrupt the fuel feed and to switch off the electric system. If this is not done properly, when the bicycle tumbles, though it is set at the bicycle running, the fuel may leak out of the float chamber of the carburetor or the like and will be dangerous. Also, if the electric system is left on, the battery will be discharged and depleted.

Therefore, a fuel cock and ignition switch are provided so that, when the engine is not being operated, i.e., at the time of the bicycle running, the fuel cock may be closed and the ignition siwtch may be off. However, in the prime mover-equipped bicycle, during the running, when the bicycle running is shifted to engine running or vice versa, the rider will find it troublesome to operate the separately provided fuel cock and ignition switch in response to the running condition, and will very likely carelessly forget the operation though the running condition is changed.

In the case of the shift from bicycle running to engine running, unless the above-mentioned cock and switch are operated, the engine will not start and therefore the rider will not fail to operate them. But, in the case of the shift from engine running to bicycle running, the rider will often forget to operate them. Unless the ignition switch is off, the engine will not stop and therefore the ignition switch will hardly be forgotten to be operated. But the fuel system will often be forgotten to be cut off. As a result, at the time of tumbling or the like of the bicycle, there will be a danger of fuel leaking out.

SUMMARY OF THE INVENTION

The present invention provides a power plant apparatus for prime mover-equipped bicycles which includes an engine having a first output shaft, a pedal drive shaft, and starting clutch means having an output member and a clutch provided between the output shaft of the engine and the output member, and connected with the output shaft by an input to the output member only at the time of starting the engine. The apparatus also includes an intermediate drive shaft receiving an output of the pedal drive shaft through gears, and a second output shaft provided between the intermediate drive shaft and an intermediate shaft receiving an output of the output shaft of the engine. Changing means are provided slidably on the second output shaft, and a gear is provided rotatably on the second output shaft and receives power from the intermediate shaft through gears and is engaged selectively with the second output shaft by the changing means provided slidably on the second output shaft to engage and disengage the engine and the pedal drive shaft with each other. Low speed and high speed driving gears are opposed respectively to the second output shaft and the intermediate drive shaft and include a one-way clutch. Also included are driven gears meshing with the low speed and high speed driving gears, and a speed changing means selectively engaging one of the driven and driving gears with each other by sliding in the axial direction.

An object of the invention is to provide a power plant for prime mover-equipped bicycles capable of having bicycle running and engine running selected, wherein a means of changing two power transmitting system of bicycle running and engine running over to each other are provided to make it possible to selectively change the speeds of bicycle running and engine running, to make the power transmission and change mostly with a gear mechanism, to unify the power transmitting system, speed changing system and change-over system, and to make the structure simple and compact.

Another object is to provide a power plant wherein the power transmitting system and others are unified to make it possible to make the power change and speed change operating systems one system, and to simplify the operation and operating system including the manual operating means. This also provides a power plant wherein, in the running using the engine running together, the influence of engine power on the pedal drive is prevented, and the operation is easy and safe to achieve.

A further object is to provide a power plant wherein, as the mechanism of changing low and high speeds over to each other is interposed as mentioned above, as different from a pedal driving system of one speed, the selecting range of running speeds is large, and thus the practiability of the prime mover-equipped bicycle is further increased.

A next object is to provide as accompanying the above-mentioned power plant a speed changing gear for prime mover-equipped bicycles wherein a smooth gear speed change, having no joint and no neutral state in the power transmission, can be made in changing speeds from a high speed to a low speed or vice versa in the above-mentioned power plant. This is attained with a simple and reliable structure.

An object is to provide a speed changing gear for prime mover-equipped bicycles wherein, as the generation of a neutral state is prevented in changing speeds as mentioned above, the speed of the power transmission can be smoothly changed without producing an insulated state between the two driving systems of the pedal drive and engine drive, and without giving influences such as an overload and reduced output between both power sources. The power sources and power transmitting systems are effectively protected and the speed changing shaft can be made smoothly in its operation as there is no neutral state, and the operation is made easy and safely.

A further object is to provide a power plant including a pedal starting clutch device wherein, in starting the engine with the pedal of the power plant, when the pedal to be artificially operated at the time of starting the engine is in a position which is deviated from the top dead point or its vicinity, and in which the pedal is easiest to rotate and develops a treading force, the pedal driving system and engine starting system will be connected with each other.

An object is to provide a pedal starting clutch device wherein the engine starting operation is easy, and the engine can be started easily and positively by developing a sufficient treading force. The operation and handling of the bicycle are made easy.

A further object is to provide a power plant including a device for changing the operation and stop of the engine over to each other for prime mover-equipped bicycles wherein, in the above-mentioned power plant in which a bicycle running and engine running can be changed over to each other, in case the engine running is shifted to the bicycle running, the engine operating condition will be automatically perfectly stopped in relation to the speed changing means.

Particularly, an object of the invention is to provide a device for changing the operation and stop of the engine over to each other for prime mover-equipped bicycles. A member operated to change a bicycle running and engine running over to each other and a fuel feeding and interrupting mechanism are related with each other so that the fuel feeding system may be interrupted as operatively connected with the change of the power transmitting system over to the bicycle running. The electric system of the ignition device or the like may be switched off as operatively connected with the above. Thus, the fuel system and electric system of the power system may be automatically interrupted by the operation of changing over to the bicycle running without requiring any special operation.

An object of the present invention is to provide a device wherein the rider is not at all required to make the respective fuel interrupting operation and electric circuit opening operation at the time of changing over to the bicycle running. Also, leaking of the fuel when the bicycle tumbles and depletion of the battery caused by forgetting to make such operations are positively prevented so that the device may be very favorable in safety, running operation and maintenance.

Further, an object of the present invention is to provide a device wherein, as operatively connected with the speed changing means, the above operation is made as operatively connected with the speed change by one operating system so that the device for changing the operation and stop over to each other may be simple in structure, may be positive in operation and may be guaranteed in reliability.

Preferred embodiments of the present invention shall be explained in detail in the following, with reference to the accompanying drawings. More particular and other objects of the invention may become clear from the following explanation.

BRIEF DESCRIPTION OF THE DRAWINGS

FIGS. 11 to 13 are views explaining in turn the operation of the shift fork plate.

DETAILED DESCRIPTION

Figure 3:
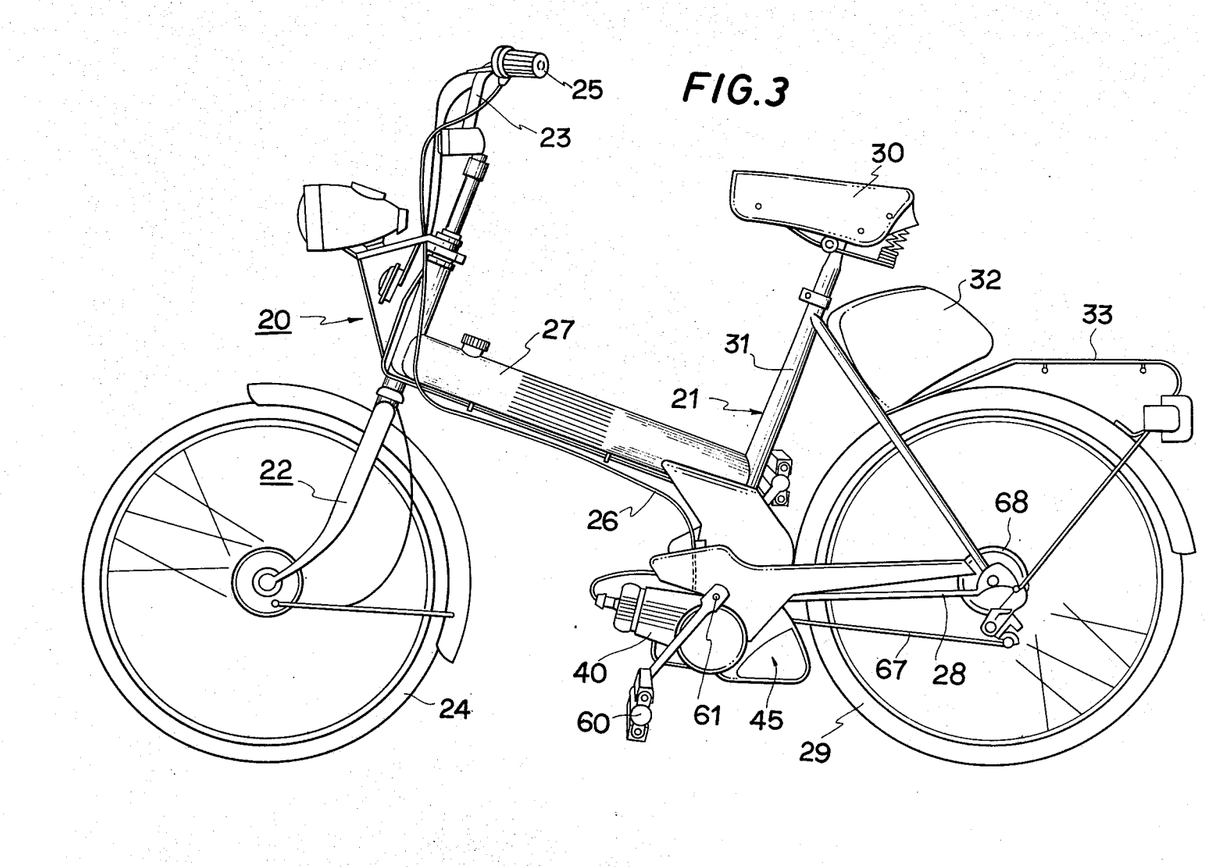
FIG. 3 is a view showing the layout of a bicycle equipped with a prime mover.

FIG. 3 shows a prime mover-equipped bicycle 20 to which the present invention is applied, and wherein: 21 indicates a body frame; 22 indicates a front fork supporting a steering handle 23 at its upper end and a front wheel 24 at its lower end; 25 indicates a change grip which is also a grip provided on handle 23 for making a changing operation by hand; 26 indicates a change wire connected at one end with a shifting member of a power plant and at its other end with change grip 25; 27 indicates a fuel tank; 28 indicates a rear fork; 29 indicates a rear wheel supported by rear fork 28; 30 indicates a seat provided on a post 31 raised above the intermediate portion of the frame; 32 indicates a tool bag; and 33 indicates a rear carrier.

Figure 1:
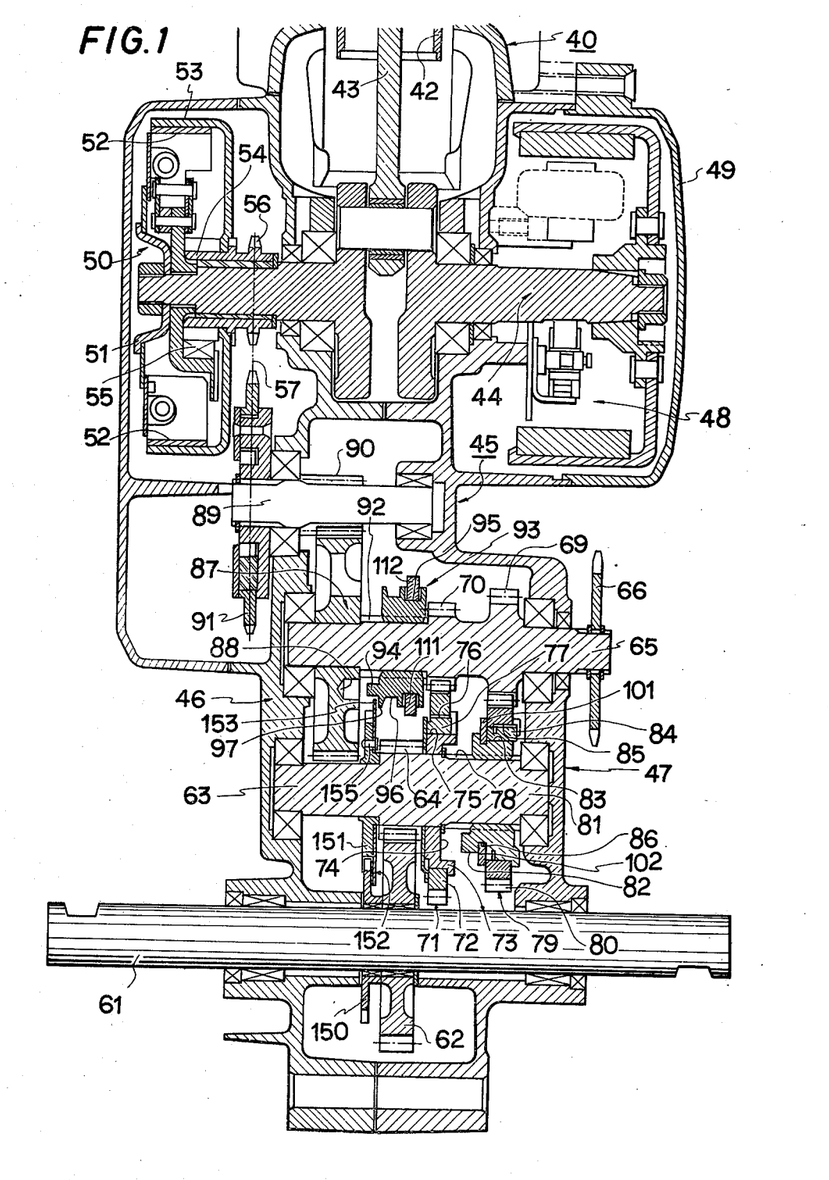
FIG. 1 is a cross-sectioned plan view of a power plant including a power transmitting system and changing mechanism, as developed as if respective parts were in the same plane (for convenience of explanation).
Figure 2:
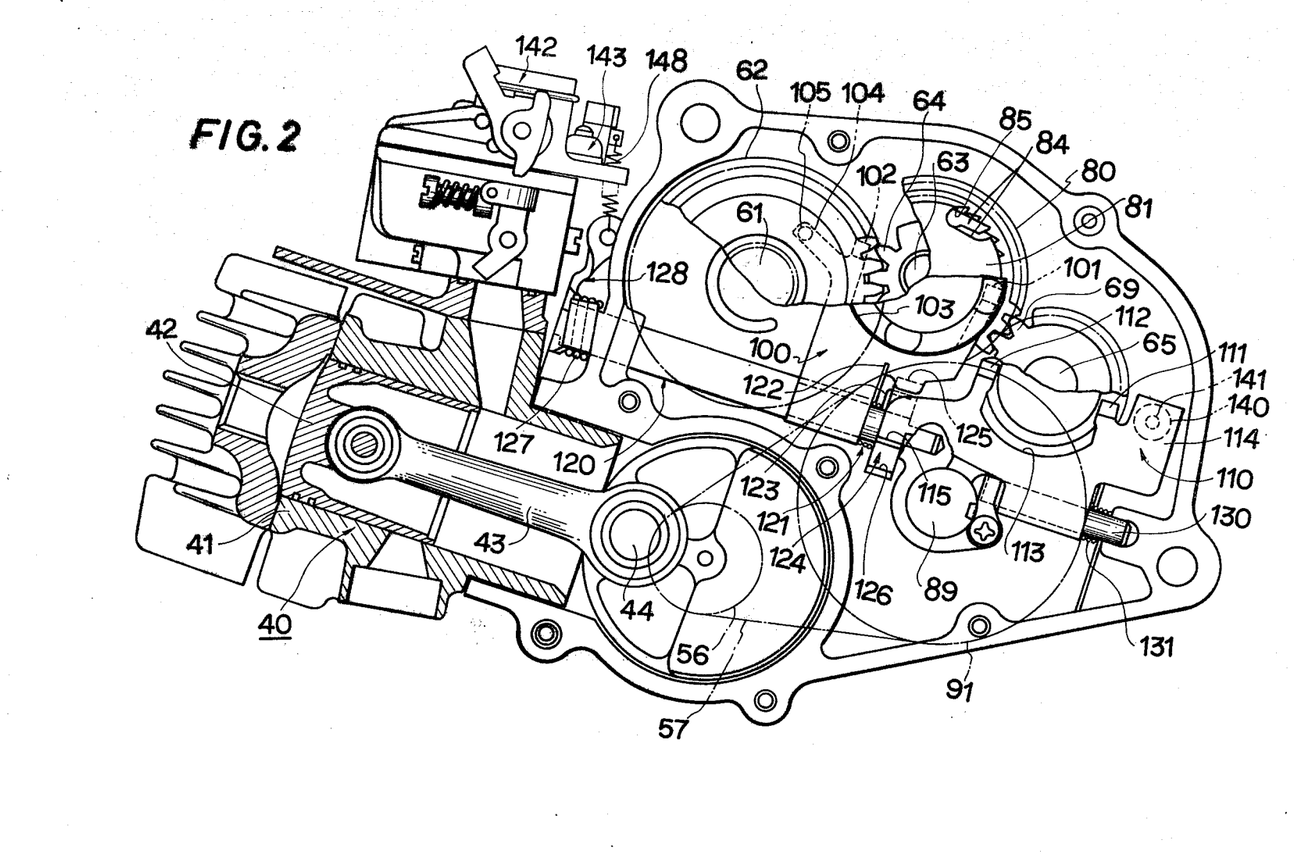
FIG. 2 is a side view wherein an engine portion is sectioned and the part of the case of a power plant is split into two parts so that the internal mechanism may be seen, as partly sectioned (for convenience of explanation).

A power plant according to the invention is clearly shown in FIGS. 1 and 2.

The power plant comprises an engine 40, an artificial drive shaft 61 driven by pedals 60, and a power transmitting mechanism, a changing mechanism, engine starting clutch mechanism, and operating mechanisms operating the changing mechanism, interrupting and feeding the fuel, and switching on and off a current source, all arranged between the engine and artificial drive shaft.

Engine 40 is provided with a cylinder 41, a piston 42 fitted in cylinder 41, and a connecting rod 43 connecting piston 42 with a first output shaft or crankshaft 44. Crankshaft 44 is held by a case 45, which is a crankcase and transmission case, containing and enclosing the above-mentioned mechanisms of the power plant. Case 45 is formed by integrally joining right and left divided case halves 46 and 47. Crankshaft 44 is provided at its first extended end with an ignition device 48 including a flywheel, an alternating current generator, such as a magneto, and a contact device, and covered by a cover 49.

Crankshaft 44 is provided at its second extended end with a centrifugal clutch device 50. An inner member 51 of device 50 is secured to the second end of crankshaft 44 and is provided with centrifugally expanding type shoes 52. An outer member 53 is secured to a sleeve 54 loosely fitted to the outer periphery of the second extended end of the crankshaft 44, and is opposed in its inside diameter to shoes 52. A one-way clutch 55 is provided between inner member 51 and outer member 53 and engages inner member 51 only at the time of the rotation of the outer member, i.e., at the time of the starting rotation, and disengages when inner member 51 is rotated by crankshaft 44. Sleeve 54 is integrally provided with a sprocket 56 so that, by the input of the pedal drive of sprocket 56 by a chain 57, the outer member 53 may be driven, the inner member 51 may be driven through the clutch 55, and the crankshaft 44 may be driven to start the engine 40. After the engine starts, shoes 52 of the inner member 51 will expand to engage and drive the outer member 53, and the engine power will be transmitted through the sleeve 54 and sprocket 56. In this condition, clutch 55 will be in an escaping direction and will be disengaged. Clutch device 50 is covered with a cover 58.

An artificial drive shaft 61 is provided above and parallel to crankshaft 44 to cross between cases 46 and 47. Shaft 61 is extended at both ends outside the cases 46 and 47 to connect with pedals 60 as shown in FIG. 3, and to be rotated by treading the pedals 60. A drive gear 62 is secured on shaft 61 within the case and engages with a gear 64 provided in the intermediate portion of a rotatable intermediate shaft 63 that is located adjacent and parallel to gear 62 and borne by bearings between cases 46 and 47.

A second output shaft 65 is rotatably borne adjacent and parallel to intermediate shaft 63, and is extended at one end outside the case 47. A sprocket 66 is secured to shaft 65, and is connected with a sprocket 68 provided on rear wheel 29 through a chain 67 to drive the rear wheel 29 with the output of shaft 65.

Two driven gears 69 and 70, differing in the number of teeth and having high speed and low speed drive ratios, are provided a little separated from each other in the axial direction on shaft 65. Gear 69 is the first gear for a low speed gear device, and gear 70 is the second gear for a high speed gear device. Two driving gears 71 and 79 having high speed and low speed drive ratios corresponding to driven gears 69 and 70 are provided on intermediate shaft 63 and constantly mesh with driven gears 69 and 70, respectively.

High speed drive gear 71 consists of a ring-shaped gear 72, constantly meshing with gear 70, and a boss 73 fitted to ring-shaped gear 72, positioned in the axial direction on shaft 63 and rotatable with respect to shaft 63. A recess 74 forming one side of a dogtooth clutch is made in boss 73, and a recess 75 containing a pawl 77 is made on the outer periphery of the boss. Pawl 77 engages only when a ratchet 76 provided in the inside diameter part of gear 72 and the gear 71 are in a driving state, and escapes when the second gear 70 side of shaft 65 drives. Thus, gear 71 is provided with a one-way clutch to transmit power only when the gear drives, but to idle when it is driven.

Low speed driving gear 79, which is the first gear, consists of a ring-shaped gear 80 constantly meshing with gear 69 and a boss 81 fitted to gear 80, rotating integrally with shaft 63, and slidable in the axial direction with a spline fitting or the like. Boss 81 is provided with a projection 82 opposed to recess 74 of gear 71 and forming the other side of the dogtooth clutch. A recess 83 is formed on a part of the outer periphery of the boss. A pawl 84 is contained in recess 83, is resiliently sprung in a direction of constantly meshing with a ratchet 85 formed on the inner periphery of gear 80, and is shown partly in section in FIG. 2. In operation, pawl 84 will engage and clockwise drive the ratchet 85 to drive the shaft 65 through the meshing gear 69 only when boss 81, driven by intermediate shaft 63, rotates clockwise in FIG. 2, but will escape to insulate boss 81 and gear 80 from each other when gear 69 rotates at a high speed, i.e., a one-way clutch is formed.

A ring-shaped groove 86 is formed on the outer periphery of boss 81 of gear 79. Forks 102 and 101 extended out on the right and left of a first shift fork plate 100 are engaged with groove 86. Forks 101 and 102 are connected with each other through a semicircular part 103 to hold pawl 84 on the side. A stopper 104 is provided as extended integrally sidewise outside fork 102.

A power transmitting gear 87 is regulated in the axial direction on shaft 65, is provided rotatably with respect to shaft 65, and meshes with a gear 90 of an intermediate shaft 89 provided parallel between the shaft 65 and crankshaft 44. A sprocket 91 is secured on shaft 89, and is connected with sprocket 56 on the crankshaft side through chain 57. Recesses 88 forming one side of the dogtooth clutch are made in gear 87.

A spline 92 is provided between gear 87 and high speed gear 70 on shaft 65 provided with gear 87. A shifter 93 is provided slidably in the axial direction on spline 92, and is provided on its end surface with projections 94 forming the other side of dogtooth clutch together with recesses 88. Shifter 93 is also provided on the outer periphery with double grooves 95 and 96, and in the direction having projections 94 with a flange 97. Forks 112 and 111 extended out on the right and left of a second shift fork plate 110 are engaged with one groove 95 of shifter 93, and are connected with each other through a semicircular part 113. A pressing part 114 is provided as extended integrally sidewise outside fork 111.

Shift plate 100 is fitted in its base to one end of a shift fork shaft 120 provided in the forward and rearward direction within cases 46 and 47. A spring 121 wound on shaft 120 is locked at one end 122 to shift plate 100 so that plate 100 may be resiliently pressed in the direction of perfectly meshing the low speed driving gear 79 with low speed driven gear 69, i.e., in the direction of retaining the position in FIG. 1. A substantially L-shaped engaging member 124 (FIGS. 7 and 11 to 13) is secured to the end of shaft 120. Spring 121 is locked at the other end 123 to member 124 so that an arm 125 extended upwardly may interfere with a part of plate 100.

Shift fork shaft 120 is extended out at its other end near to the engine, is resiliently pressed in the returning direction by a return spring 127, and is connected at the extended end with an operating arm 128 connected with change wire 26 and change grip 25.

Shift fork plate 110 is supported by a shaft 130, and is always resiliently pressed in the returning direction by a spring 131. An arm 115 is provided to project sidewise in the part adjacent to plate 100 of this plate 110, and is opposed to an arm 126 which is the lower side of member 124 and is extended out sidewise to interfere with arm 126 as required.

Figure 9:
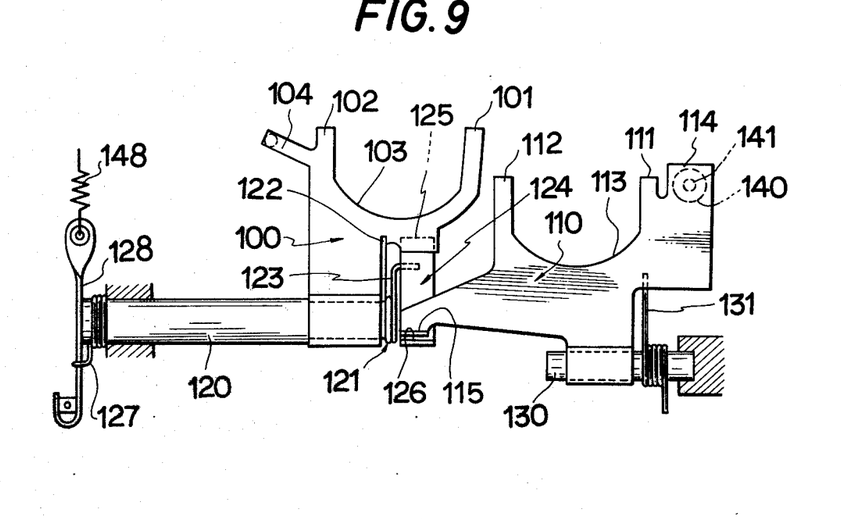
FIG. 9 is an explanatory view showing a shift fork plate forming a shifting mechanism.

The relation of shift fork plates 100 and 110 is shown in FIG. 9.

The operation of the power transmitting system shall now be explained. In FIG. 1, a bicycle running is shown, the engine power system is switched off; the change grip 25 is in the off-position shown in FIG. 4; and the change wire 26 is pulled to its furthest extent. In this bicycle running and off state, as plate 100 is resiliently pressed in the off direction by spring 121, in the shift fork plates 100 and 110 (FIG. 13) the stopper 104 will contact stopper 105 and the low speed driving gear 79 will be held in the right position shown in FIG. 1, and will be perfectly meshed with the low speed driven gear 69. On the other hand, with this off rotating angle of the shift fork shaft 120, the engaging member 124 will be inclined (FIG. 13); the lower arm 126 will interfere with arm 115 of plate 110 to lift it against spring 131; plate 110 will be held in the right position; and, as shown in FIG. 1, the shifter 93 will be held separated from gear 87. In this state, with the operation of pedals 60, the drive shaft 61 will be driven and, with this drive, the intermediate shaft 63 will be driven through gears 62 and 64. With the drive of the intermediate shaft 63, the boss 81 of gear 79 constantly engaged in the rotating direction with shaft 63 will be rotated and, with the engagement of pawl 84 which is a one-way clutch with ratchet 85 of the external teeth 80, the teeth 80 will be rotated clockwise in FIG. 2 and the gear 69 meshed with them will be driven to rotate and drive the shaft 65. This rotation is transmitted to rear wheel 29 through sprocket 66 and chain 67 to rotate and drive it. At the time of this artificial drive, only gears 79 and 69 will mesh with each other to make a low speed running.

Figure 4:
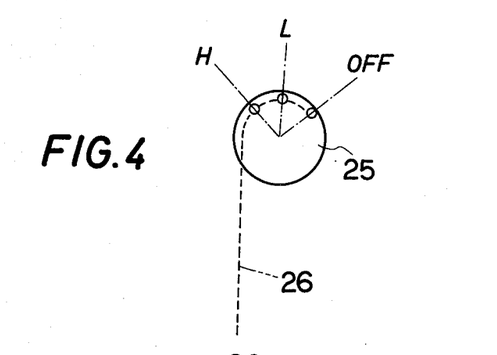
FIG. 4 is an end view of a change grip as a changing operation member, showing also the relation of changing positions.

When making a running by using the engine power together, change grip 25 will be operated and rotated to be set in position L in FIG. 4. With relaxation of the stroke of change wire 26, the shift fork shaft 120 rotates in the resiliently pressing direction by an allowed predetermined angle, and the engaging member 124, integral with shaft 120 rotates. With this rotation, the clearance between arm 125 and plate 100 is eliminated. Arm 125 will contact plate 100 and, at the same time, arm 126 will rotate counter-clockwise (FIG. 12) and plate 100 resiliently pressed in the counter-clockwise direction by spring 131 will rotate in the same direction. As a result, shifter 93 engaged with forks 111 and 112 of plate 110 will slide toward gear 87 on spline 92 of shaft 65 (leftwardly), the projections 94 will engage with recesses 88, and the low speed drive torque of shaft 65 will be transmitted to gear 87. Shaft 63 having gear 90 meshed with gear 87 will be driven. Member 53 connected with sprocket 91, chain 57 and sprocket 56 will be driven, and crankshaft 44 will rotate to start engine 40. After the engine starts, the engine output will be transmitted to the intermediate shaft 89 through crankshaft 44, member 51, shoes 52, member 53, sprocket 56, chain 57 and sprocket 91 and to shaft 65 through gears 90 and 87 and shifter 93. The pedal drive force will also be conveyed to shaft 65, and a resultant of the engine power and pedal drive force will be transmitted to shaft 65.

When changing from low to high speed, grip 25 will be further rotated and will be set in position H in FIG. 4. Shaft 20 will be further rotated by the resiliency of spring 127, the member 124 will rotate this much, and plate 100 will be rotated counter-clockwise in FIG. 12 against spring 121 by arm 125 of member 124 to a predetermined position as in FIG. 11. Gear 79 shown in FIG. 1 will be moved leftwardly in the drawing on spline 78 on shaft 63 by forks 101 and 102, and the projection 82 will engage with recess 74 of gear 71 freely rotating with respect to shaft 63. In this case, the stroke of the dogtooth clutch is set to be smaller than the width of gears 79 and 69 so that both projection 82 and recess 74 engage with each other while gears 79 and 69 are meshed with each other. The drive of shaft 61 will be transmitted to gear 71 through gear 79, and power will be transmitted to gear 72 through the one-way clutch consisting of pawl 77 and ratchet 76. With the meshing with gear 70 on the shaft 65 side, the shaft 65 will be rotated and driven at a high speed to make a high speed running.

In the above, gears 69 and 79 constantly mesh with each other, but boss 81 engages with teeth 80 through the one-way clutch and, as this is in an escaping direction, even in the meshing state, the external teeth 80 will idle.

Figure 5:
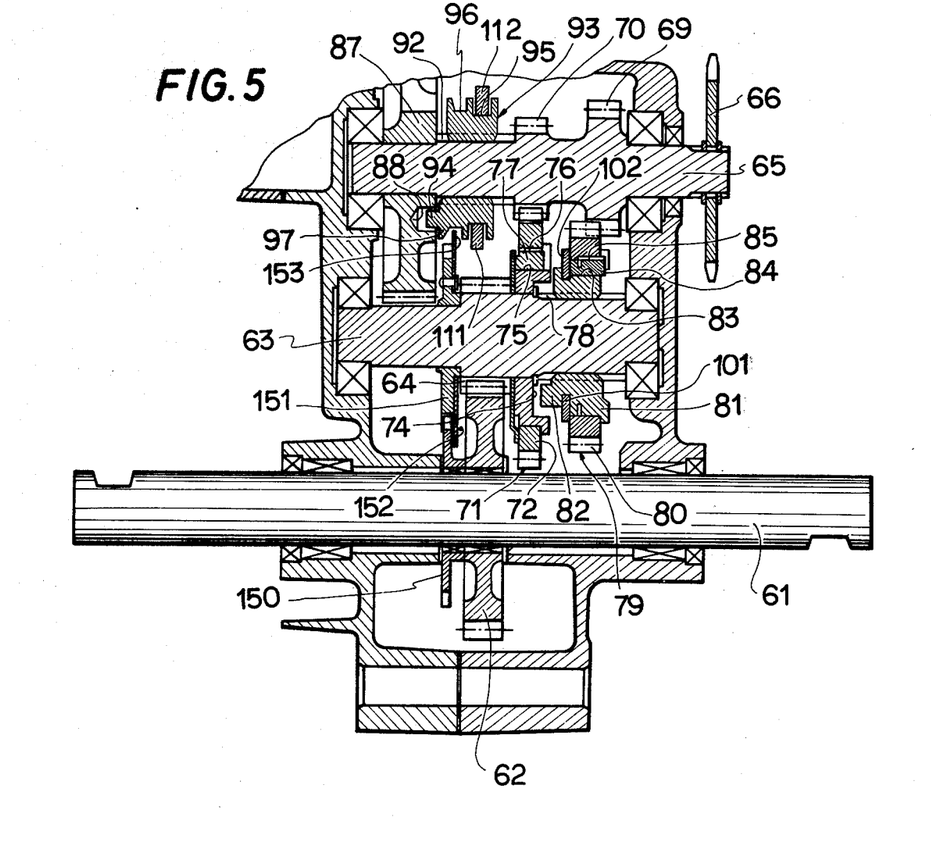
FIG. 5 is a view explaining a changing state, showing only the parts in FIG. 1 necessary for explanation.
Figure 6:
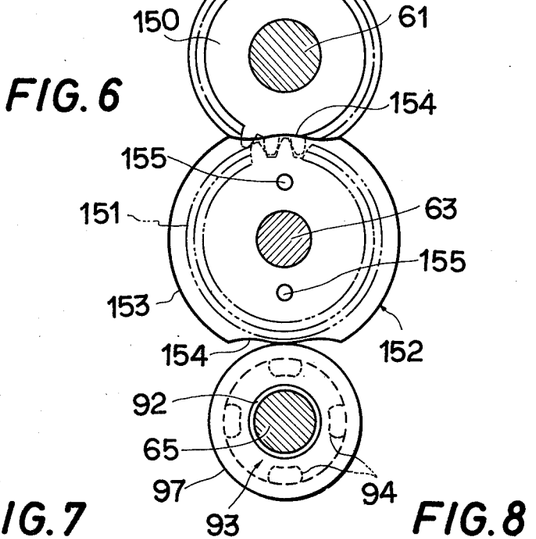
FIG. 6 is a magnified side view of a starting clutch device, as sectioned in the shaft part.

The meshing state of the gears of the power plant in this high speed running state is shown in FIG. 5.

In the above, even if gear 71 is not provided with a one-way clutch and is idled on shaft 63 as an integral gear, it will function the same as mentioned above. Thus gear 71 may be formed to rotate freely.

With the operation of twisting the grip 25, by the operating mechanism of one system, the bicycle running, engine starting, and change-over of the low speed running and high speed running using the engine power together can be made. The change-over from high to low speed, engine stopping and bicycle running are made by the procedures reverse to the above.

Change from low to high speed running or vice versa is made with the constant mesh gears as mentioned above. Further, as the one-way clutch is provided, at the time of changing the speeds, in the state having no joint or neutral state, while the gears are kept meshed with each other as they are and without influencing the gear power transmission, the speed change will be able to be made. Therefore, even if the speed changing operation is made while making the pedal drive while using the engine power together, the pedal drive will not suddenly idle and will not be shocked, and a smooth speed change will be made. Without giving influences, such as of an overload and output reduction to the artificial drive system and engine drive system, the speed change is made smoothly, the power source and power transmitting system is effectively protect, and the protection of the engine and safety of the bicycle is increased. The low speed drive gear is made a one-way clutch, and is formed to be slidable in the axial direction. The high speed drive gear is made freely rotatable, and is made connectible with the low speed drive gear only through a dogtooth clutch, and therefore the structure is simple.

The power plant and power transmitting system are formed almost entirely of gears, and can therefore be unified. The power system can be made a unit, and the structure can be made simple and compact. Because two power systems are unified, such running condition changing operation system and speed changing operation system can be formed in one system. Therefore, the operation system can be simplified and the operation can be made easy.

Figure 10:
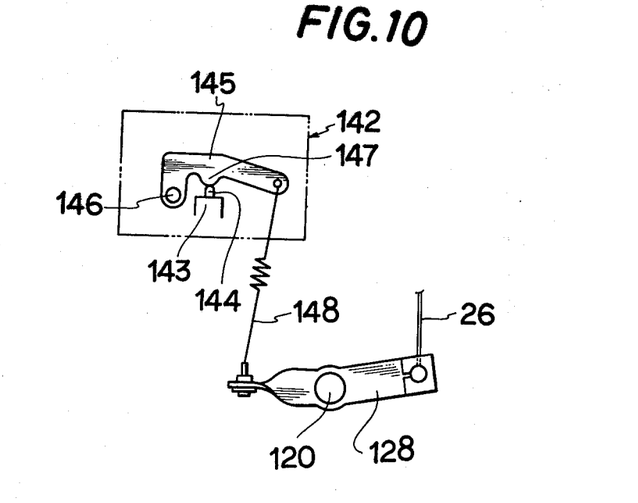
FIG. 10 is an explanatory view showing a fuel interrupting mechanism.

The engine operating and stopping device suggested for accompanying the invention shall be referred to in the following. A microswitch 140 switching the ignition device on and off is provided in the part opposed to a pressing part 114 of plate 110, and its pressing piece 141 is made to face part 114. An operating lever 145 related with an operating piece 144 of a fuel interrupting valve 143 of a carburetor 142 provided adjacent to engine 40 is provided as shown in FIG. 10. Lever 145 is formed at one end to be rockable with a pin 146 as a fulcrum, and is connected at its other end with one end of a coil spring 148 which is connected at the other end with the end part on the side opposed to change wire 26.

Figures 11, 12, 13:
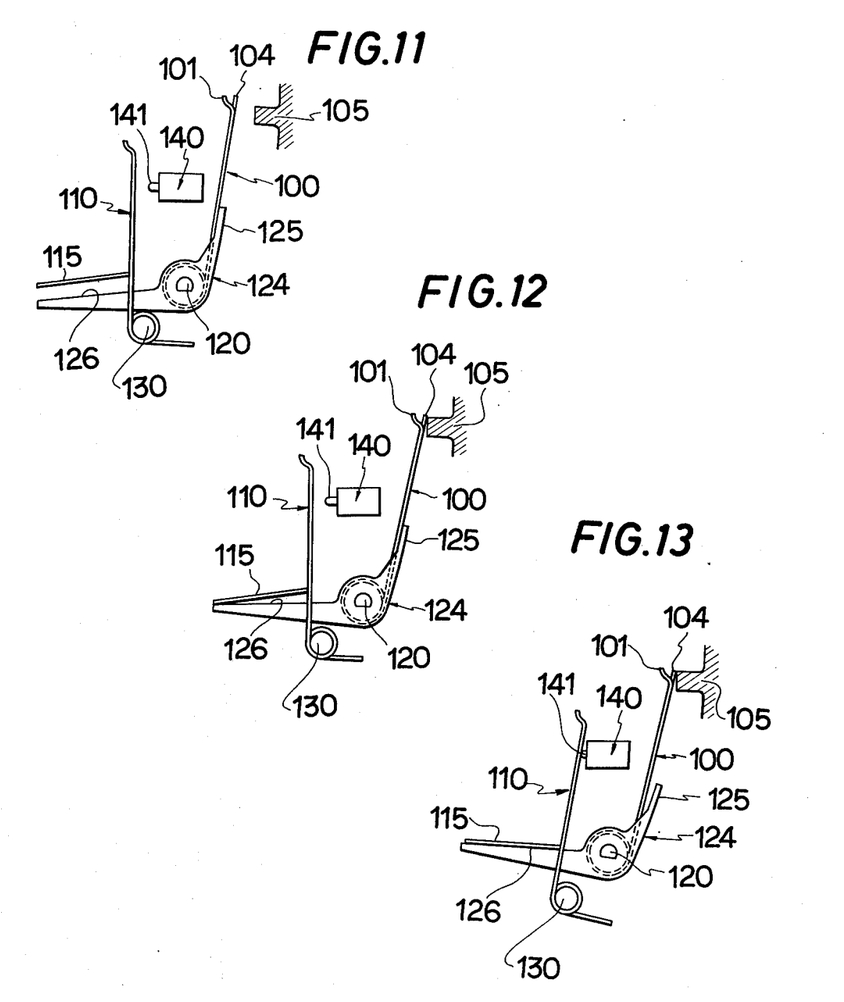
FIG. 11 shows a high speed running of the engine.
FIG. 12 depicts a low speed running with the same.
FIG. 13 shows a bicycle running, as the electric system is opened.

FIG. 11 shows a high speed running state wherein the engine power running is used together and the high speed gear is driven. In this state, plate 110 will engage shifter 93 with gear 87 by the resiliency of spring 131; part 114 will be sufficiently separated from piece 141 of microswitch 140; switch 140 will be on; the circuit of the ignition device will be closed; and electricity will be fed.

Next, with the shift to low speed running, member 124 will rock clockwise (FIG. 12) with the rotation of shaft 120 and the arm 126 will eliminate the clearance between it and arm 115 and will contact the lower part of arm 115. Arm 128 (FIG. 10) will rock counter-clockwise but will not pull spring 148, and the arm 145 will not lower so much as to interrupt the fuel. In this low speed position, stopper part 104 will contact stopper 105. Further rotary displacement will be regulated, and the meshing of gears 69 and 79 will be maintained.

When grip 25 is returned to the off-position in FIG. 4, shaft 120 will further rotate, member 124 will further rotate clockwise (FIG. 13) and arm 126 will lift arm 115 of plate 110 and will forcibly rotate it clockwise. Shifter 93 will be moved rightwardly to be disengaged from gear 87 connected with the engine. Together with it, part 114 will press piece 141 to open switch 140 and the circuit of the ignition device. Thus, the current to the ignition plug will be interrupted.

Together with it, with the further rocking counter-clockwise in FIG. 10 of operating arm 128, the spring 148 will be pulled. When spring 148 is pulled over a limit, lever 145 will be rotated and lowered with pin 146 as a fulcrum, and operating piece 144 of interrupting valve 143 will be pushed down with the pushing part 147 to interrupt the fuel feeding passage fitted within (not shown). The fuel feeding will be automatically interrupted. Piece 144 will be pressed resiliently with spring 148 to increase the effect of tightly sealing the valve. The fuel interrupting valve of the carburetor 142 can be properly selected to be of a needle type, a type of interrupting the fuel feed to the fuel nozzle, a type of interrupting the fuel feed to the float chamber, or any other type.

When the running is thus changed over to the bicycle running by the operation of the change grip, the electric circuit of the ignition device will be automatically cut off as operatively connected with the fuel interruption. When engine running is to be used together, in the order reverse to the above, the fuel will be fed and the circuit of the ignition device will be closed as operatively connected with the changing mechanism by the operation of grip 25. It is not necessary at all to operate the fuel cock and ignition switch.

When shifting from bicycle running to engine running or vice versa, the rider need not interrupt the fuel feed and switch the ignition switch on and off, the fuel will be fed and the ignition will be switched on and off automatically with the changing operation of one system in response to the running condition. And the leak of fuel and exhaustion of the battery caused by forgetfulness is positively prevented.

The invention includes a clutch device in the engine starting operation as in the following as a part of the power plant.

A driving adjusting gear 150 is secured on shaft 61. A driven adjusting gear 151 meshing with gear 150 is rotatably provided on shaft 63. The drive ratio of gears 150 and 151 is 1:1.

A regulating plate 152 is fitted to one surface of gear 151, and is formed of a plate spring material. Plate 152 has a diameter larger than gear 151, projects on the outer peripheral side out of the outer periphery of gear 151, has an outside diameter interfering on the outer peripheral side with the outer peripheral side of flange 97 of shifter 93, and may be riveted to one surface of gear 151 with a plurality of rivets 155 or alternatively screwed.

Figure 8:
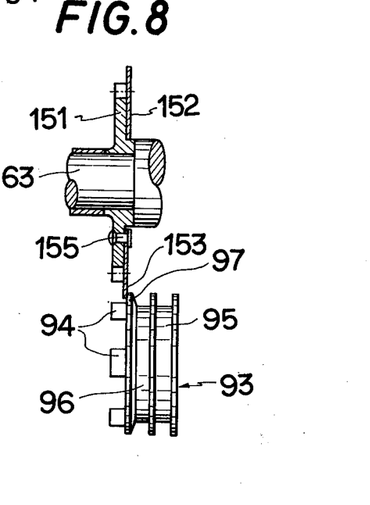
FIG. 8 is a view showing the regulated state of FIG. 7, showing only the essential parts.

Plate 152 is fitted to gear 151 so that, in case, with the slide of shifter 93, the flange 97 interferes with the outer peripheral side 153 of plate 152, the slide of the shifter 93 shown in FIGS. 1 and 8 in the clutch connecting direction (leftwardly) may be regulated by contact in the vicinity of the outer peripheral side part of plate 152 with the outer periphery of gear 151. The slide of shifter 93 in the connecting direction may be regulated, and shifter 93 may not be connected with gear 87.

The slide in the clutch disengaging direction (rightward in FIGS. 5 and 7) when shifter 93 is connected with gear 87 through the dogtooth clutch of 88 and 94, is allowed by flexing the outer peripheral side part 153 even if the flange 97 interferes with part 13.

Two cuts 154 are made at angular intervals of 180° on the outer periphery of plate 152. As gear 151 has the same number of teeth and the same drive ratio as gear 150, the cuts 154 are provided at an angle at which the largest treading force is applied to pedal 60 by avoiding the top dead point or its vicinity with respect to shaft 61. Cuts 154 are provided at angular intervals of 180° so that the clutch may be connected by a rotation within 180° of pedal 60.

When grip 25 is rotated to position L to start the engine from FIG. 1, with the rocking of fork 110, the shifter 93 will slide toward gear 88. When pedal 60 is in a position at or near the top dead point in which the treading force is difficult to apply or in a position in which the treading operation is difficult to make, the part 153 will interfere with flange 97 (FIG. 8) in a relative position of shaft 61 and gears 150 and 151. Though the clutch connecting operation is made, shifter 93 will be regulated in the slide in the connecting direction and will not be able to be connected. Pedal 60 and shaft 61 will be idling. When a predetermined rotating angle position in which a treading force is easy to apply to pedal 60 is reached with the continuation of the pedal operation of shaft 61, either one of cuts 154 rotating at the same drive ratio will reach the position of flange 97. Flange 97 will be released from regulation by part 153. Shifter 93 will slide toward gear 87, the dogtooth clutch of 94 and 88 will engage, the shifter 93 and gear 87 will be engaged with each other, and the engine will be started.

Plate 152 will rotate beyond flange 97, but part 153 will enter groove 96 and the rotation after the engagement will not be obstructed.

Only in the position in which the treading force is easy to apply with respect to pedal 60, when starting the engine, the pedal driving system and engine driving system will be connected with each other to start the engine.

Figure 7:
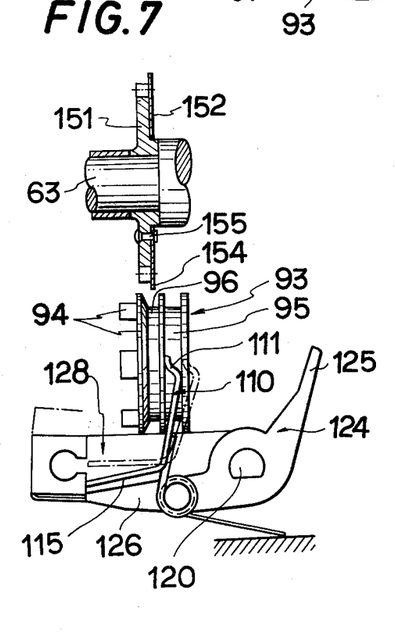
FIG. 7 is a sectioned end view showing the relation between the changing member and engine starting engaging member.

When stopping the engine, by the operation of grip 25, the shifter 93 will tend to move rightwardly from the state in FIG. 7 with the operation of plate 110, but part 153 will flex and therefore the shifter 93 will slide smoothly in the disengaging direction without being obstructed.

In the above embodiment, two cuts 154 are provided on plate 152. However, one cut will also do.

Thus, when starting the engine with the pedal operation by connecting the pedal driving system and engine driving system with each other, the clutch means connecting both driving systems with each other will not be connected at or near top dead point on the pedal, but will be connected in a pedal treading position avoiding the top dead point. According to the invention, there can be obtained a clutch device for starting an engine wherein adjusting gears are provided respectively on a pedal drive shaft and intermediate shaft adjacent to it, and are meshed with each other with the same number of teeth and the same drive ratio. The engine can be easily started by only providing a regulating plate having a cut in a part.

We claim:

1. A power plant apparatus for prime mover-equipped bicycles, comprising:
   an engine having a first output shaft;
   a pedal drive shaft;
   starting clutch means having an output member and a clutch provided between said output shaft of said engine and said output member, and connected with said output shaft by an input to said output member only at the time of starting said engine;
   an intermediate drive shaft receiving an output of said pedal drive shaft through gears;
   a second output shaft provided between said intermediate drive shaft and an intermediate shaft receiving an output of said output shaft of said engine;
   changing means provided slidably on said second output shaft;
   a gear provided rotatably on said second output shaft and receiving power from said intermediate shaft through gears and engaged selectively with said second output shaft by said changing means provided slidably on said second output shaft to engage and disengage said engine and said pedal drive shaft with each other;
   low speed and high speed driving gears being opposed respectively to said second output shaft and being disposed on said intermediate drive shaft, and including a one-way clutch;
   low speed and high speed driven gears meshing with said low speed and high speed driving gears; and
   a speed changing means selectively engaging one of said driven and driving gears with each other by sliding in the axial direction.

2. Apparatus according to claim 1, wherein:
   a speed changing operation member is provided on said intermediate drive shaft;
   said low speed driving gear is slid by said speed changing operation member through said one-way clutch; and
   said high speed driving gear arranged parallel to said low speed driving gear is provided rotatably on said intermediate drive shaft so that said low speed driving gear may be slid by the operation of said speed changing operation member to be engaged and disengaged with the high speed driving gear on the same shaft, and said low speed driving gear may be constantly meshed with said meshing low speed driven gear on said second output shaft.

3. Apparatus according to claim 2, wherein:
said high speed driving gear is provided on said intermediate drive shaft with said one-way clutch.

4. Apparatus according to claim 2, wherein:
low speed and high speed driven gears are provided separated in the axial direction on the second output shaft;
said low speed driving gear is made to constantly mesh both driven gears through a one-way clutch on said shaft; and
said low speed driving gear is engaged with the high speed driving gear on said intermediate shaft while said low speed driving gear and said low speed driven gear are kept meshed with each other.

5. Apparatus according to claim 1, including:
an operation device comprising a first speed changing operation member engaging and sliding a changing gear provided slidably on said intermediate drive shaft;
said changing gear constantly meshes with a driven gear on said second output shaft, and is engaged and disengaged by sliding in the axial direction with a gear provided opposed on said intermediate drive shaft;
a second speed changing operation member engaging and sliding a changing member opposed to a power transmitting gear provided rotatably on said second output shaft for connecting in and out the engine power and sliding on said second output shaft to engage and disengage with it;
said first speed changing operation member being resiliently borne on an operating shaft rotated by an outside wire operation and engaged in a predetermined position with an engaging member provided on said shaft; and
said second speed changing operation member being resiliently borne by and selectively engaged with an engaging member provided on said operating shaft.

6. Apparatus according to claim 5, wherein:
said first and second operation members are resiliently pressed in the direction of disengaging said changing gear and changing member.

7. Apparatus according to claim 5, wherein:
said operating shaft is connected with a manual operating piece, such as a change grip, so that said operating shaft may be rotated by the rotation of said manual operating piece and said changing gear and changing member may be slid through said operation members.

8. Apparatus according to claim 5, wherein:
said first and second operation members are resiliently pressed and held in the direction of disengaging said changing gear and changing member so that, in the first rotating position of said operating shaft, said second operation member may be rocked by the engagement of the engaging member and said changing member may be engaged with a gear connected with said engine and, in the second rotating position, said first operation member may be rocked through an engaging member and said changing gear may be engaged with the other gear on said intermediate drive shaft.

9. Apparatus according to claim 5, including:
an operation and stop changing device for automatically selecting the operation and stop of said engine by the operation of an operating means engaging and disengaging the engine power and pedal drive with each other by the slide in the axial direction of a changing member opposed to the gear on the engine side.

10. Apparatus according to claim 9, wherein:
an operating piece for manually changing the bicycle running and engine running, and an operating member operation said changing member are operatively connected with each other; and
a valve interrupting the feed of the fuel in the artificial running position in the disengaging position of said changing member is provided so that the fuel may be interrupted by automatically operating said valve operatively connected with said operation member in the changing member disengaging position, i.e., artifical running position, of said operation member.

11. Apparatus according to claim 9, wherein:
an operating piece for manually changing the bicycle running and engine running, and an operation member operating said changing member are operatively connected with each other; and
a switching means opening an electric circuit of an ignition device in the artificial running position in the disengaging position of the changing member is provided so that said electric circuit may be automatically opened as operatively connected with said operation member in the changing member disengaging position i.e., artificial running position of said operation member.

12. Apparatus according to claim 9, including:
a fuel interrupting valve connected with said operating shaft and a switching means operating to switch on and off an electric circuit of an ignition device, and interfering in a predetermined position with said operation member so that, in the artificial running position i.e., changing member disengaging position, of said operating shaft and a second operation member, said fuel interrupting valve may interrupt the fuel and, at the same time, said switching means may be operated to open said electric circuit.

13. Apparatus according to claim 1, including:
clutch means engaging and disengaging a changing member on the pedal drive shaft side with the gear on the engine driving slide by sliding in the axial direction so that the artificial running and engine running may be selected by the engagement and disengagement of said changing member with said gear on said engine driving system side;
a pedal starting clutch device comprising a driving side adjusting gear provided on said pedal drive shaft, and a driven side adjusting gear provided on a shaft adjacent to said pedal drive shaft and meshing with said driving side adjusting gear and of the same number of teeth and the same drive ratio as of said driving side adjusting gear; and
a regulating member provided on said driven side adjusting gear for regulating the sliding in the engaging direction of said changing member, and allowing the sliding in the disengaging direction, and provided on its outer periphery with at least one cut releasing the sliding in the engaging direction of said changing member.

14. Apparatus according to claim 13, wherein:
two cuts are provided at angular intervals of 180° on the outer periphery of said regulating member.

15. Apparatus according to claim 13, wherein:
said driven side adjusting gear is freely rotatable on said intermediate drive shaft on which it is provided.

16. Apparatus according to claim 13, wherein:
said cuts of said regulating member are provided in position avoiding the top dead point of the pedal and its vicinity in the relation between said driving side adjusting gear on said pedal drive shaft and said driven side adjusting gear on said intermediate drive shaft.

* * * * *